United States Patent
Wu

[11] Patent Number: 5,938,345
[45] Date of Patent: Aug. 17, 1999

[54] STRUCTURE OF MOTOR BUSH BEARING

[76] Inventor: Ching-Lin Wu, No. 188, Yi-Yung Rd., Lin 16, Wen-chang Li, Lin-Ya District, Kaohsiung, Taiwan

[21] Appl. No.: 09/006,699

[22] Filed: Jan. 14, 1998

[30] Foreign Application Priority Data

Feb. 25, 1997 [TW] Taiwan ................................. 86202945

[51] Int. Cl.$^6$ ................ F16C 1/00; F16C 33/02
[52] U.S. Cl. ............................ 384/322; 384/295
[58] Field of Search ...................... 384/322, 286, 384/291, 276, 295

[56] References Cited

U.S. PATENT DOCUMENTS 4,090,746  5/1978  Harkins et al. .................... 384/125
4,790,672  12/1988  Komplin ........................... 384/125
5,145,266  9/1992  Saneshige et al. .................. 384/322
5,601,370  2/1997  Shibayama et al. .............. 384/276 X

*Primary Examiner*—John A. Jeffery
*Assistant Examiner*—Brandon C. Stallman
*Attorney, Agent, or Firm*—Christensen O'Connor Johnson & Kindness

[57] ABSTRACT

A bush bearing includes at least two sections with different outer diameters. The section with a larger outer diameter has an inner diameter defined by the bore of the bush bearing. The inner diameter is greater than that of the section with a smaller outer diameter so as to minimize the friction between the bearing and the motor rotor spindle.

2 Claims, 4 Drawing Sheets

STRUCTURE OF MOTOR BUSH BEARING

FILED OF THE INVENTION

The present invention is generally related to a bush bearing and in particular to a bush bearing having an improved structure to have the friction between the bearing and motor rotor spindle forming a surface contact engagement with a minimum resistant force.

BACKGROUND OF THE INVENTION

A bush bearing is used to connect the stator and rotor of a motor. Generally speaking, in the manufacture, a sufficient amount of copper powder or iron powder or other material is pressurized and shaped to form a generally cylindrical hollow bearing. As shown in FIG. 1, the conventional bush bearing 10 has a fixed outer diameter and the inner surface 11 defined by a bore thereof also has a fixed inner diameter. The outer diameter of the bearing 10 is slightly greater than the inner diameter of a central tube 13 of the stator 12. However, since the bearing 10 has a hardness lower than the central tube 13 (which is usually a metal tube or a plastic tube), it may be tightly fit into the central tube 13 in a mechanical manner.

The inner surface 11 defined by the bore of the bearing 10 is to receive the spindle 15 of the rotor 14 (such as a rotor fan). It should be noted that the bearing 10 is forcibly fit into the central tube 13 in a mechanical manner. Since the bearing 10 that has a lower hardness is subject to great fitting pressure, an irregular corrugation 16 is formed on the inner surface 11, as shown in FIG. 2. Thus, when the spindle 15 is inserted into the bore of the bearing 10, the spindle 15 forms only point contact engagement with the irregular surface 16 and no surface contact engagement may be obtained. This prevents the spindle 16 from forming a surface type friction with the inner surface 16 and due to the irregular corrugation of the surface 16, it can only have point contact with the spindle 15 and the resistance induced by the point contact is hard to control, resulting in an irregular rotation of the rotor so that the noise increases, the rotation becomes unstable and the operation life of the motor is reduced.

SUMMARY OF THE INVENTION

An object of the present invention is to provide a bush bearing having an improved structure in order to overcome the improper friction problem occurring between the spindle and the bearing in the prior art. The technical features, advantages and effectiveness of the present invention can be more fully understood by reading the following description of a preferred embodiment thereof, with reference to the drawings, in which:

BRIEF DESCRIPTION OF THE DRAWINGS

FIG. 2 is a schematic view showing the irregular corrugation formed on the inner surface of the prior art bush bearing caused when the bearing is forcibly fit into the stator central tube in;

DESCRIPTION OF THE PREFERRED EMBODIMENTS

Figure 1:
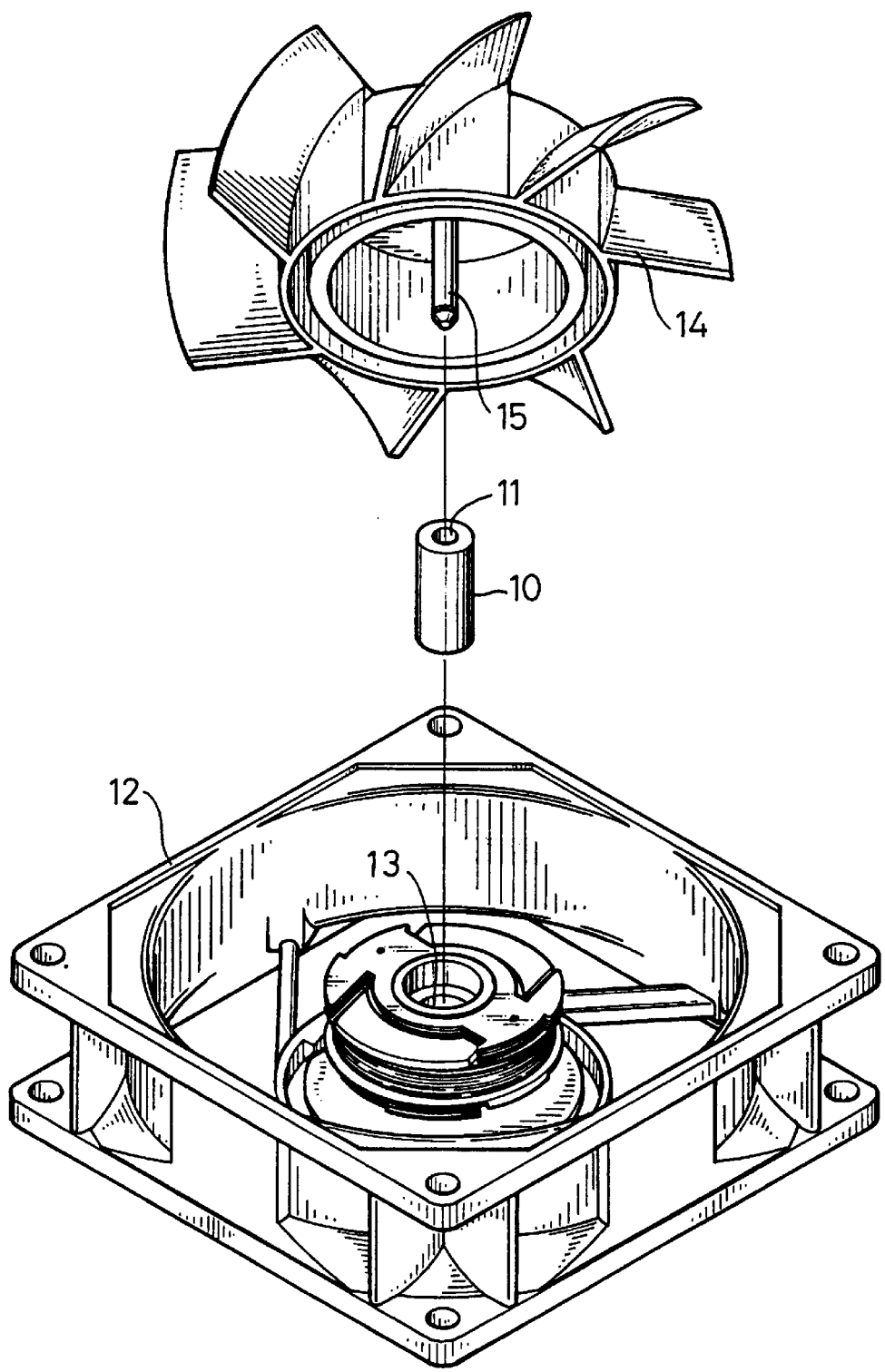
FIG. 1 is a schematic view showing the assembly of the bush bearing and the motor stator central tube and the rotor spindle.
Figure 2:
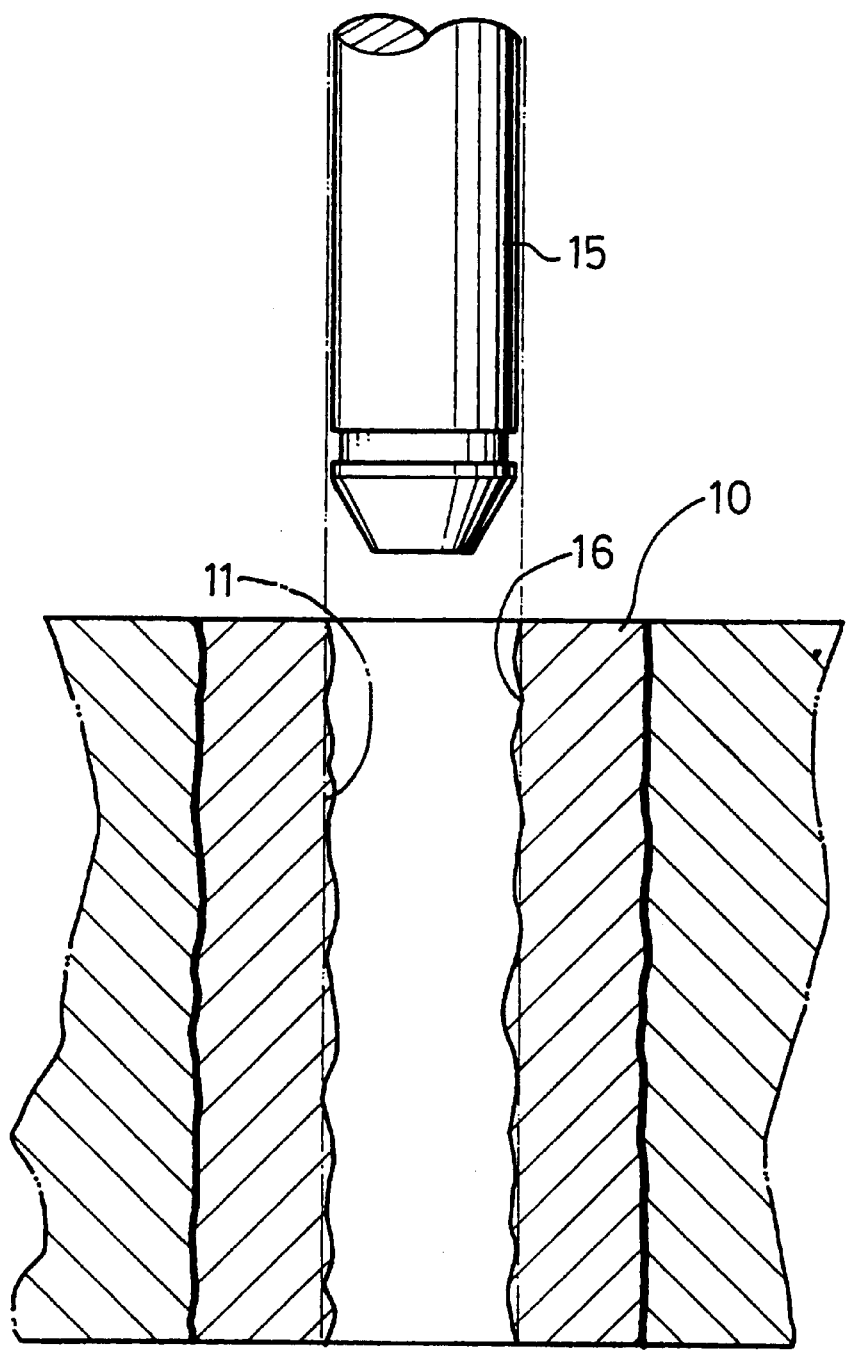
Figure 3:
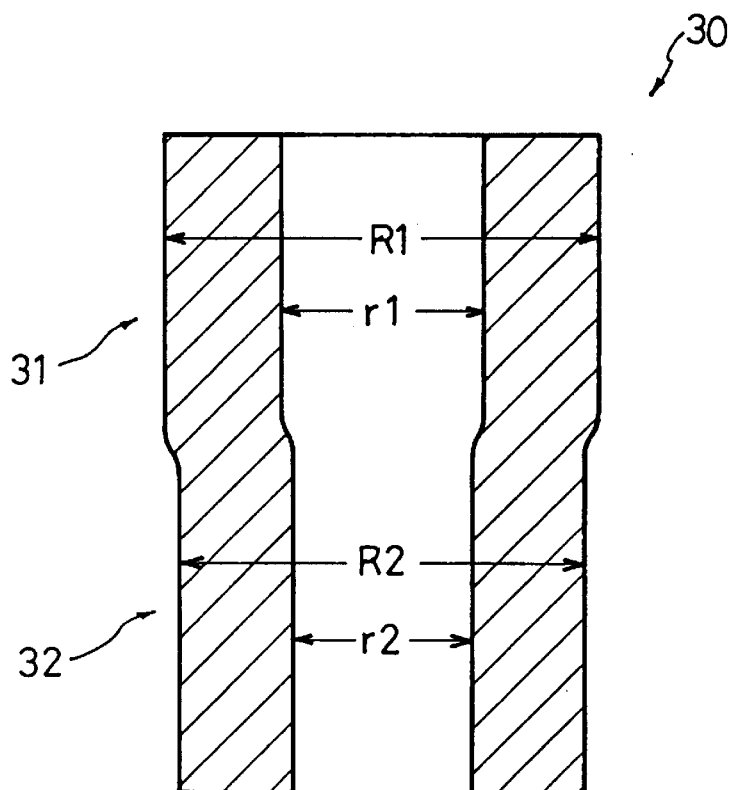
FIG. 3 is a schematic view showing a bush bearing having a two-sectioned outer surface in accordance with the present invention.

FIGS. 3 shows a preferred embodiment of the present invention. A bush bearing 30 has a first section 31 having an outer diameter R1 and a second section 32 having an outer diameter R2, wherein R1 is slightly greater than R2. The first section 31 has an inner diameter r1 slightly greater than inner diameter r2 of the second section 32. When the bush bearing 30 is fit into the stator central tube, although irregular corrugation is formed on the inner surface of the first section 31, yet the inner surface of the second section 32 is not affected so as to provide a good surface contact engagement with the spindle.

Figure 4:
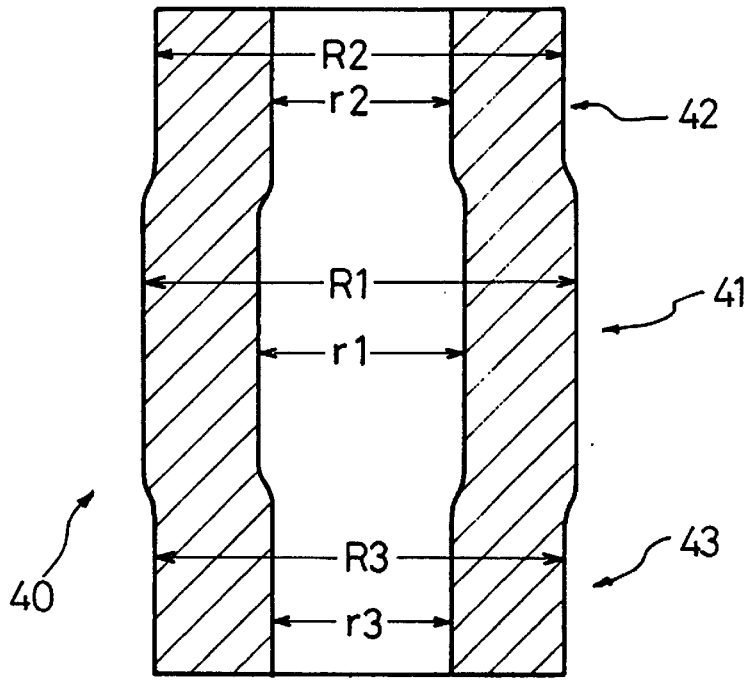
FIG. 4 is schematic view showing a bush bearing having a three-sectioned outer surface in accordance with the present invention.

FIG. 4 shows another preferred embodiment of the present invention. A bush bearing 40 comprises a first section 41, a second section 42 and a third section 43, respectively having an outer diameter R1, R2 and R3 and an inner diameter r1, r2 and r3, wherein R1 is slightly greater than R2, R3 and r1 are slightly greater than r2 and r3, and r2 substantially equals to r3. When the bearing 40 is forcibly fit into the stator central tube, a tight and secured engagement is provided by the first section 41 with the stator central tube 13 and no deformation is caused on the inner surface of the second section 42 and the third section 43 so as to provide a good surface contact engagement with the spindle.

Figure 5:
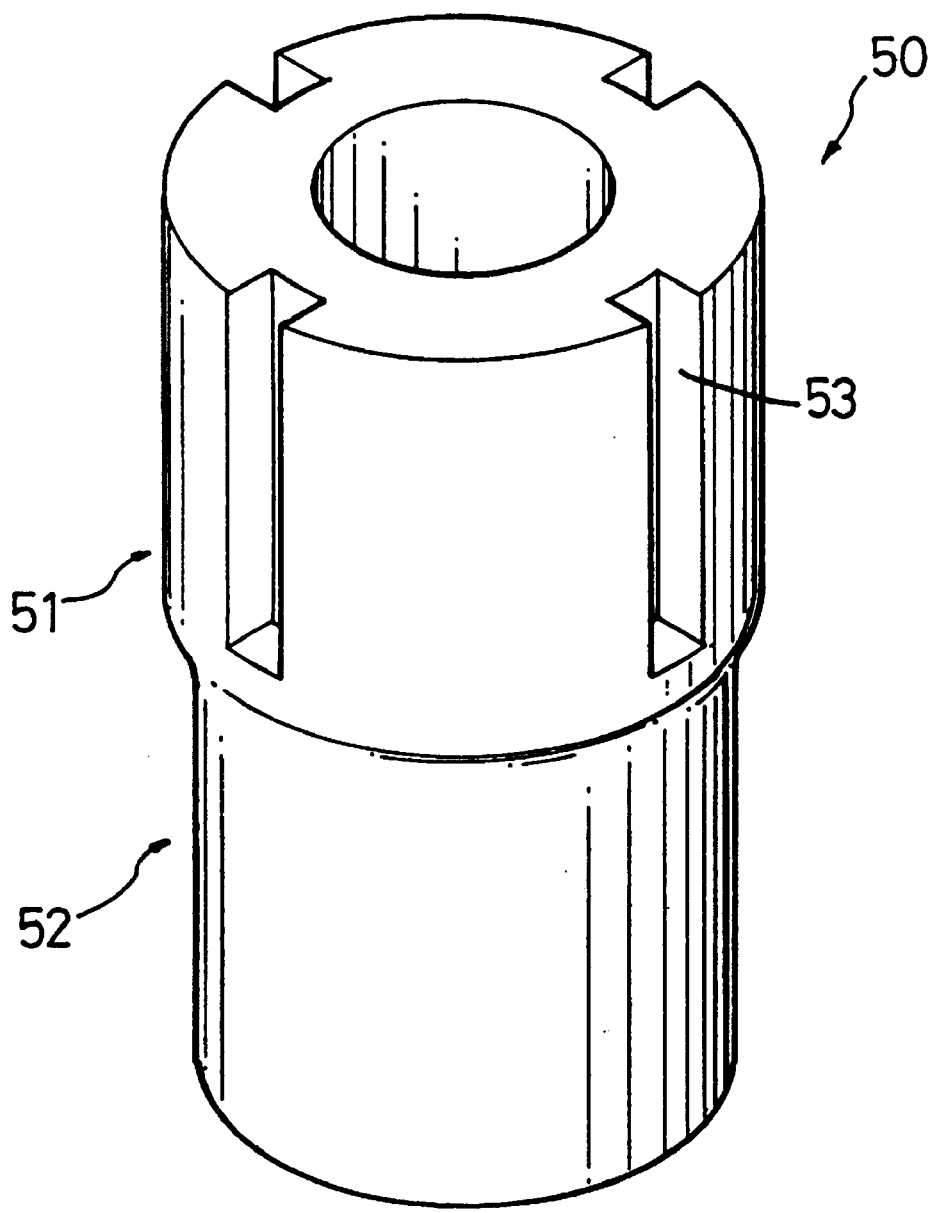
FIG. 5 is a schematic view showing a bush bearing in accordance with the present invention having a plurality of slots formed on the outer surface of a large outer diameter section.

FIG. 5 shows a preferred embodiment of the present invention. A bush bearing 50 comprises sections 51 and 52 with different outer diameters. The section 51 with a larger outer diameter comprises a plurality of slots 53 formed on the outer surface thereof, such as four slots as shown. When the bearing 50 is forcibly fit into and fixed in the central tube 13, these slots 53 provide a guide to the lubricant that flows out of the bearing due to the forcible fitting.

With the above design, the present invention is capable to overcome the problems encountered in the prior art. Although the present invention has been described with reference to the preferred embodiments, yet it is apparent to those skilled in the art that a variety of changes and modifications may be done on the illustrated preferred embodiments without departing from the spirit and essence of the present invention. Thus, the above described embodiments are for illustration only, not to limit the scope of the present invention and the scope of the present invention is defined in the appended claims.

I claim:

1. A bush bearing adapted to be fixed in a central tube of a stator and having a bore for receiving therein a spindle of a rotor, the bush bearing comprising a first section having a larger outer diameter, and a second section and a third section which are separated by the first section and having an identical outer diameter, the inner diameter defined by the bore of the bush bearing of the first section being greater than the inner diameters of the second section and the third section, whereby the bush bearing is fixed in the central tube of the stator, the inner surfaces of the second section and the third section defined by the bore are adapted to provide a surface contact engagement with the spindle of the rotor.

2. A bush bearing adapted to be fixed in a central tube of a stator and having a bore for receiving therein a spindle of a rotor, the bush bearing comprising a first section having a larger outer diameter, and a second section and a third section which are separated by the first section and having an identical outer diameter, the outer diameter of the first section being slightly greater than the inner diameter of the central tube of the stator, whereby the bush bearing is fixed in the central tube of the stator, the inner surfaces of the second section and the third section defined by the bore are adapted to provide a surface contact engagement with the spindle of the rotor.

* * * * *